United States Patent [19]
Chencinski et al.

[11] Patent Number: 6,081,904
[45] Date of Patent: Jun. 27, 2000

[54] METHOD FOR INSURING DATA INTEGRITY DURING TRANSFERS

[75] Inventors: Edward William Chencinski, Poughkeepsie; Timothy Gerard McNamara, Fishkill, both of N.Y.

[73] Assignee: International Business Machines Corporation, Armonk, N.Y.

[21] Appl. No.: 09/070,360

[22] Filed: Apr. 30, 1998

[51] Int. Cl.[7] ................................ G06F 1/12
[52] U.S. Cl. ................................ 713/400
[58] Field of Search ................... 713/501, 503, 713/400

[56] References Cited

U.S. PATENT DOCUMENTS

| | | | |
|---|---|---|---|
| 3,980,993 | 9/1976 | Bredart et al. | 713/501 |
| 4,053,944 | 10/1977 | Dixon . | |
| 4,095,265 | 6/1978 | Vrba . | |
| 4,418,386 | 11/1983 | Vrielink . | |
| 5,309,561 | 5/1994 | Overhouse et al. . | |
| 5,734,877 | 3/1998 | Ries et al. | 713/501 X |
| 5,812,832 | 9/1998 | Llorne et al. | 713/501 |

OTHER PUBLICATIONS

"Rate Based End–to–End Clock Synchronization" IBM Technical Disclosure Bulletin, vol. 37, No. 4B, Apr. 1994, pp. 459–463.

"Logic Event Synchronizer For Data Communications Between Two Logical Functions Having Different Clock Frequencies" IBM Technical Disclosure Bulletin, vol. 27, No. 4A, Sep. 1984, pp. 1911–1914.

*Primary Examiner*—Thomas M. Heckler
*Attorney, Agent, or Firm*—Lynn L. Augspurger

[57] ABSTRACT

A system and method for enabling chips which operate at different frequencies to communicate and which insures synchronous data transfers while maintaing data integrity during clock starting and stopping for multiple chip intercommunication enables chips of different techonologies to be used in the same system and yet maintain synchronous communication between chips operating at the different frequencies. The clock chip will issue a signal to all the chips in the system to start their clocks and begin processing data between two chips that run at different frequency multiples with a fast chip communicating to a chip that is a gear ratio of X times as slow and knowing when to send and receive data at the slow chips rate in order to guarantee that all transfers complete successfully. The slow chip knows when it initiates a launch to the fast chip, the fast chip has had its clocks running long enough to receive that data. A logic mechinism is provided to stop the clocks to all the chips in the system.

12 Claims, 4 Drawing Sheets

METHOD FOR INSURING DATA INTEGRITY DURING TRANSFERS

FIELD OF THE INVENTION

This invention is related to computers and computer systems and in particular to ensuring data integrity during transfers between multiple frequency domains.

BACKGROUND OF THE INVENTION

Large computer systems have a number of chips which operate at different clock frequencies. For example, the so called multichip module (MCM) in a machine we are developing to incorporate a new central processor (CP) could have chips that operate at three different frequencies. Most chips operate at the "normal system" frequency, which is also known as the "NEST" frequency. The CP chip operates at a "fast" frequency (2× the "normal system" frequency, while the CRYPTO chip operates at a "slow" frequency (½ or ½.5 the "normal system" frequency). All these chips need to synchronously communicate with each other. How this is to be done has been a vexing problem, especially in light of the fact that the solution needs to guarantee data integrity throughout the system.

SUMMARY OF THE INVENTION

Our invention provides a system which insures synchronous data transfers while maintaing data integrity during clock starting and stopping for multiple chip intercommunication. This system, and the method used in implementing our approach, enable chips of different techonologies to used in the same system and yet maintain synchronous communication between chips operating at different frequencies.

These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION:

Before considering our preferred embodiments in detail, it may be worthwhile to illustrate, by way of example, some problems which we have addressed.

The first problem occurs when the system clocks are first started. The clock chip will issue a signal to all the chips in the system to start their clocks and begin processing data. One situation that can occur in a system that contains chips with multiple frequency domains is for the fast chips to start first and transfer information to a slower chip, whose clocks have not yet started. In this case that data transfer will be lost since the slower chip's clocks were not on yet to receive this new data.

The second problem that needs to be solved is how do we transfer data between two chips that run at different frequency multiples. For example, if the fast chip is communicating to a chip that is 5 times as slow, it must know when to send and receive data at the slow chips rate in order to guarantee that all transfers complete successfully.

Finally, the last problem occurs when we stop the clocks to all the chips in the system. For example the slow chip must know that if it initiates a launch to the fast chip, the fast chip must have its clocks running long enough to receive that data.

Our Preferred Embodiment

Figure 1:
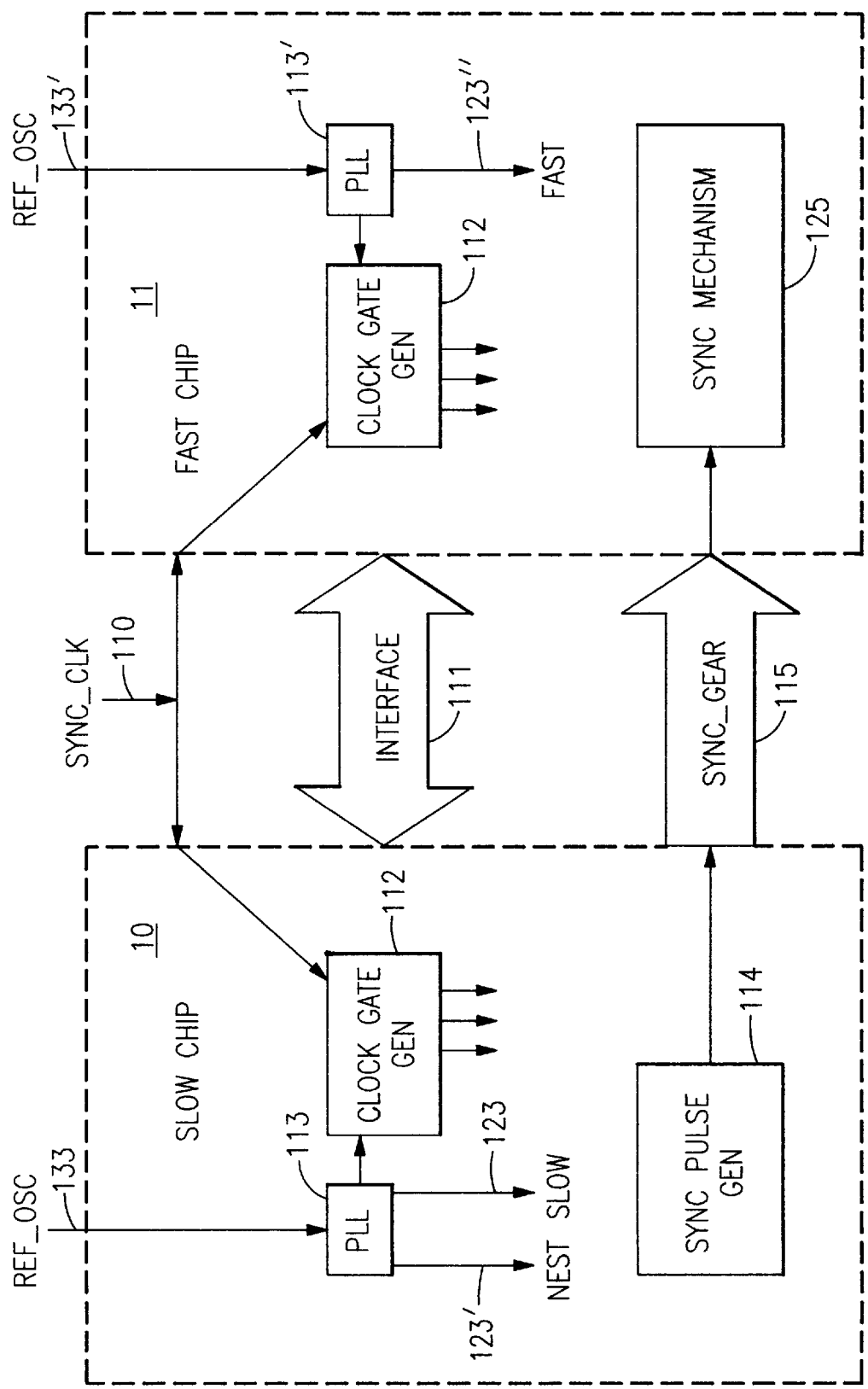
FIG. 1 shows an overview of the preferred embodiment.

We have provided, as we will describe with respect to FIG. 1, a system with multiple, e.g.3 or other plurality of, clock frequencies: CLK(SYS), CLK(FAST) and CLK (SLOW) which has advantages and disadvantages. The master signal that controls whether clocks are on is called SYNC_CLK. SYNC_CLK is launched from a central source by latches that are clocked by the system reference clock CLK(SYS). Both the fast and the slow chip receive this reference signal in latches clocked by CLK(SYS). Each chip has to interpret this signal as it pertains to the chip's internal clock frequency. In the case of the fast chip 11 in FIG. 1 the clock CLK(FAST) always rises with the rising CLK_SYS. So the fast chip can always start it's clocks immediately. However, the slow chip 10 may not in general have a frequency which is a multiple of the CLK(SYS). If the clock for the slow chip CLK(SLOW) was gated directly with the latched SYNC_CLK on a CLK(SYS) basis, then the starting and stopping clock cycle would, in general, be cut off, and unpredictable clocking would occur. When clocks are stopped and restarted the fast and slow chip would get out of sequence with respect to each other and data integrity problems would inevitably result.

All chips in this system receive a reference oscillator that runs at a period which is a multiple of the CLK(SYS) period. All clocks in the system are derived from this reference oscillator clock signal 133, 133', and periodically all rise concurrently with the reference oscillator. The CLK(SYS) and the CLK(FAST) rise with EVERY rising reference oscillator, while the CLK(SLOW) does not in general rise with every rising reference oscillator.

In accordance with our preferred embodiment illustrated in the FIGURES we have provided a design which contains a circuit implemented mechanism for implementing our invention on the slow chip that keeps track of the rising CLK(SLOW), CLK(SYS) and reference oscillator and generates a signal that is sent to the fast chip so that it can predict ahead of time the CLK(FAST) cycle that will rise with CLK(SLOW). Because of this signal we generate, called SYNC_GEAR, the fast chip can predict how the slow chip will interpret the SYNC_CLK relative to CLK (SLOW). Our design generates the SYNC_GEAR signal though a series of SRLs (Shift Register Latches), some clocked by CLK(SLOW) & some clocked by CLK(SYS). They observe the reference oscillator and make use of the fixed edge timing relationships to determine the allignment, which is encoded in the SRL states. Our design includes a ring of SRLs on the fast chip as well, with each SRL representing a relative alignment state of CLK(FAST) and CLK(SLOW). Exactly one bit in this ring is turned on by the SYNC_GEAR signal periodically, and the ring thereby maintains a state that during all cycles represents the relative alignments. One specific bit of this ring will be active every time the fast and the slow clock exactly line up. Our design uses this bit, which is called ALLOW_XFER, to allow the interface latches and state machines to consider an interface cycle complete. We therefor gate the incoming data into the interface boundary latches (from the wire connected to the slow chip) and we gate the outgoing data into the interface boundary registers (from the internal registers on the fast chip.)

The final circuit mechanisms of the design solves the data integrity problem caused by the fact that the fast clock can start before the slow clock and the slow clock can overrun the fast clock. The fast clock may start before the slow clock because of the chance alignment of SYNC_CLK and the fast and slow edges. This creates the potential that the fast chip will consider a transfer complete and go to the next transfer before the slow chip even starts. Conversely, when the clocks stop, the fast chip may stop immediately while the slow chip continues. This creates the potential that the slow chip sees a transfer alignment at a time when the CLK (FAST) isn't running. Our design solves the startup problem by blocking the ALLOW_XFER for a specific number of cycles after SYNC_CLK has occurred to guarantee that CLK(SLOW) has started and will be ready for the first transfer cycle in time. The stopping problem is solved by preemptively cancelling a CLK(SLOW) cycle based on the alignment of the slow and fast clocks at the moment the SYNC_CLK signal first drops. This alignment is a predictor that CLK(FAST) is in danger of stopping after CLK(SLOW) has already committed to start a transfer cycle. The alignment is determined by the same set of SRLs on the slow chip that have been described relative to the generation of SYNC_GEAR.

Turning now to our invention in greater detail, it will be seen from FIG. 1 which illustrates by way of example our preferred embodiment in which a fast chip 11 must communicate with a slow chip 10 in a computer system system that runs at a "nest" frequency. All chips are coupled to receive a synchronization signal "SYNC_CLK, which is active for a single nest cycle for every nest cycle that the system clocks run. The chips in the system generate clock gates with the clock gate generator 112 and 112' of the respective chips by delaying this SYNC_CLK signal a consistent (and constant) number of cycles. The clock gates allow latch and trigger clocks to propagate from the oscillator signal coming out of the phased locked loops PLLs 113, 113'. The phase locked loops of the chips receive the reference oscillator signal 133, 133', multiply it to the proper frequency and insure that the chips all have exactly synchronized rising trigger nest clocks. Basically, the fast chip's PLL produces a frequency faster than the normal nest oscillator frequency, and the slower chip's PLL one slower than the nest oscillator frequency.

The slow chip 10 uses a sync pulse generator 114 (illustrated in detail in FIG. 2) for generating sync pulses to determine the alignment of it's slow oscillator 123 with the nest oscillator signals. This is used to generate sync_gear 115 as a signal which is sent to the fast chip 11 to allow it to communicate over the interface 111 with the slow chip 10. The sync pulse gen mechanism 114 logic also contributes to the clock gate generation by holding off the SYNC_CLK until a valid edge before allowing clock gates, so that the clocks are not cut in mid cycle. The fast chip receives the SYNC_GEAR in a sync mechanism 125 logic, which coordinates the transmission and reception of signals on the interface 111 to the slow chip 10.

Figure 2:
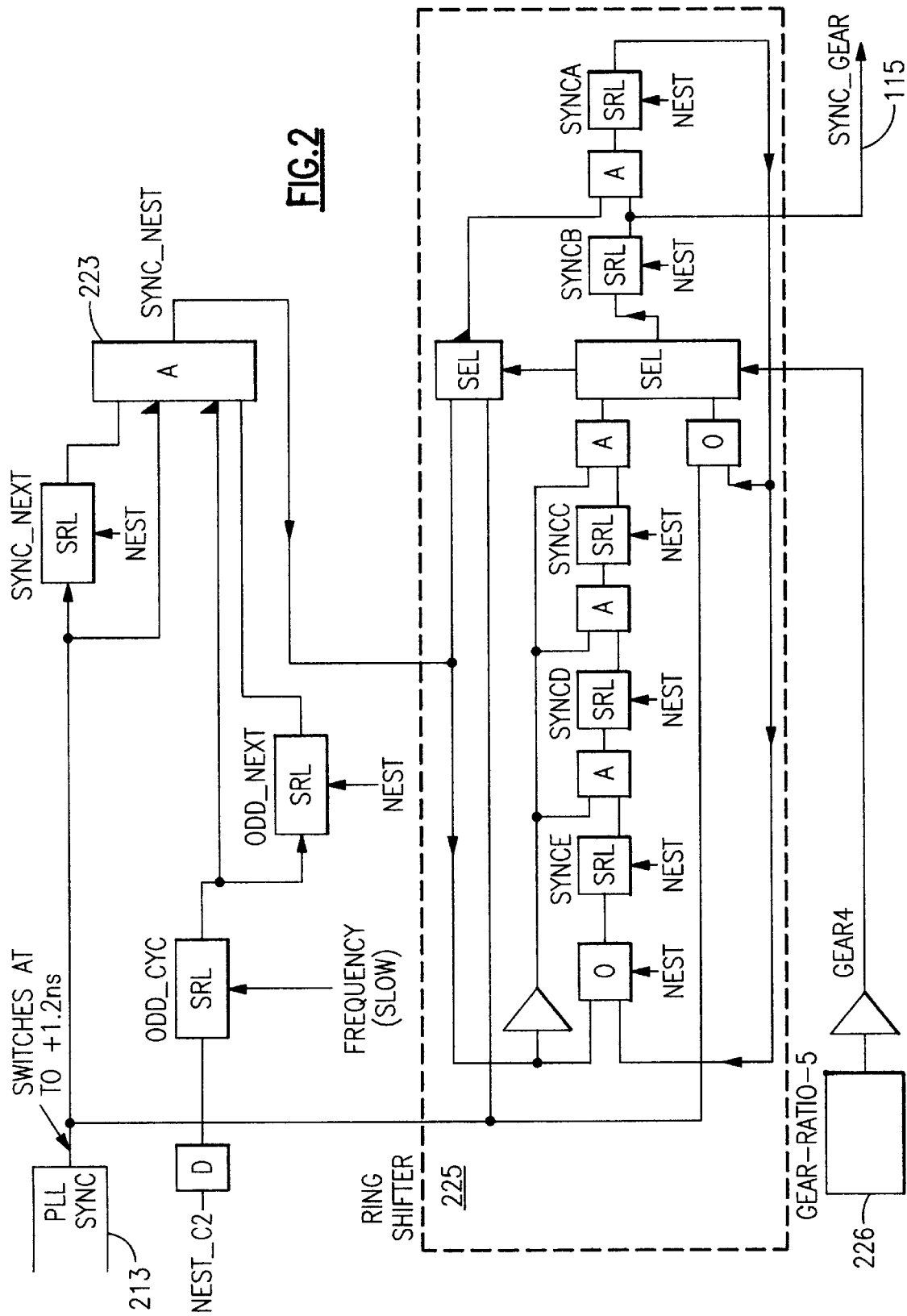
FIG. 2 shows details of the sync pulse generator of FIG. 1 for the "slow" chip.
Figure 4:
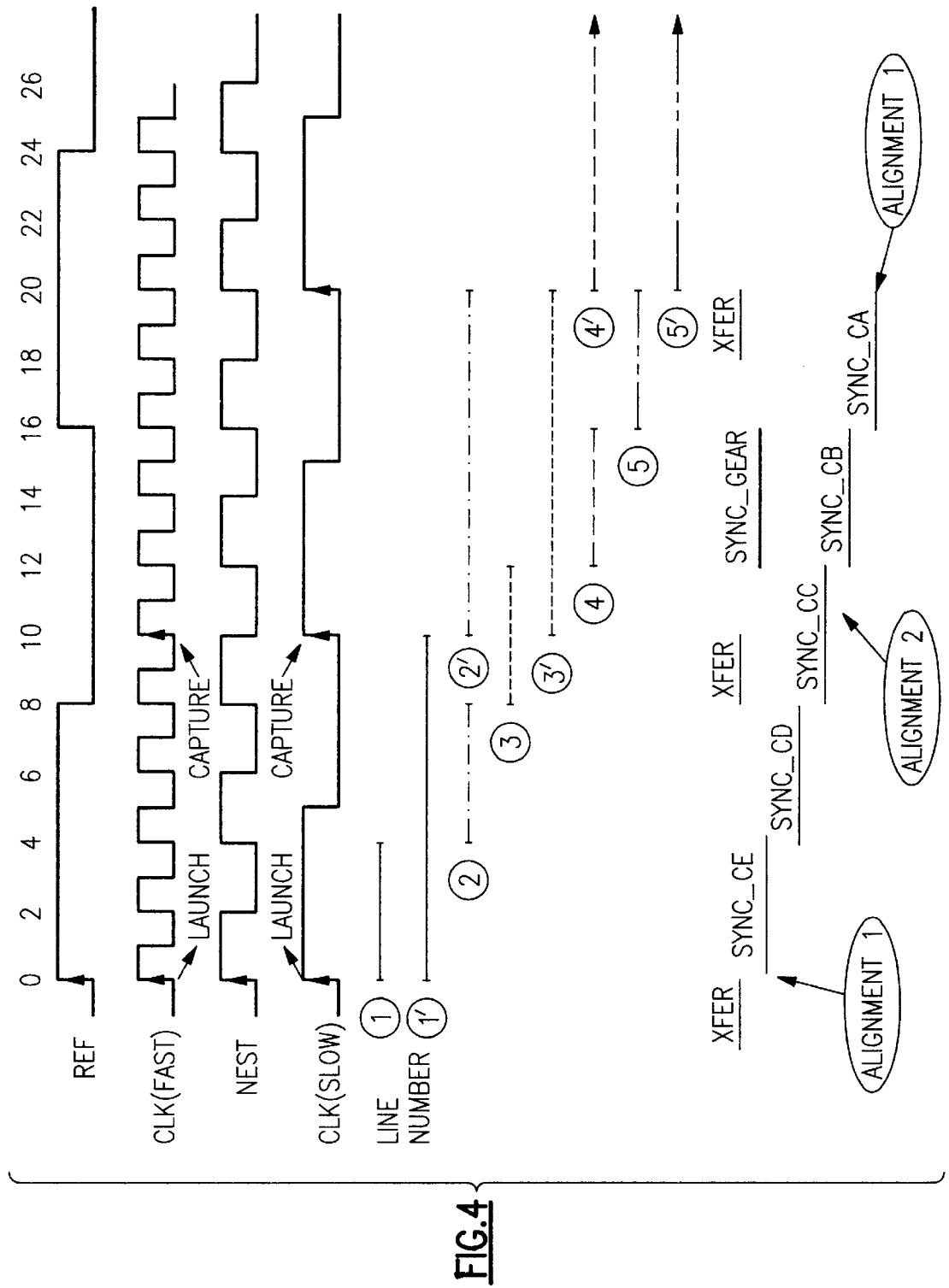
FIG. 4 is a timing diagram that illustrates our method of insuring synchronous data transfers while maintaing data integrity during clock starting and stopping.

FIG. 2 shows a detailed description of the sync generator 114 for a system which supports gear ratios of 4 and 5 (fast-chip/slow-chip frequencies) with a gear ratio 5 timing shown as an example in FIG. 4, with the examples of gear rations being illustrative of support for a gear ratio of any selected integers. As shown in FIG. 1 the PLL 113 generates a "PLL_SYNC" signal supplied to the PLL sync input pin 213 which is active for one nest cycle before the rising reference oscillator.

The SYNC_NEST signal 223 is generated from this, combined with nest and slow clocks through SRLs and logic as selected by the scanned in input of a gear ratio at a scan input 226 location (Gear-ratio 5 in the illustration). The SYNC_NEST signal then feeds the ring shifter 225 and periodically resynchronizes it. This ring shifter 225 keeps track of the alignments of the slow clock and the nest clock. Timing points (Sync A, B, C, D, E), which are transmitted from the sync pulse generator 114 to the clock gates 112 (FIG. 3) from this ring control the variable number of cycles delay on the SYNC_CLK signal for the slow chip frequency clock gates 112. A timing point also is sent to the fast chip as "SYNC_GEAR" signal 115.

Figure 3:
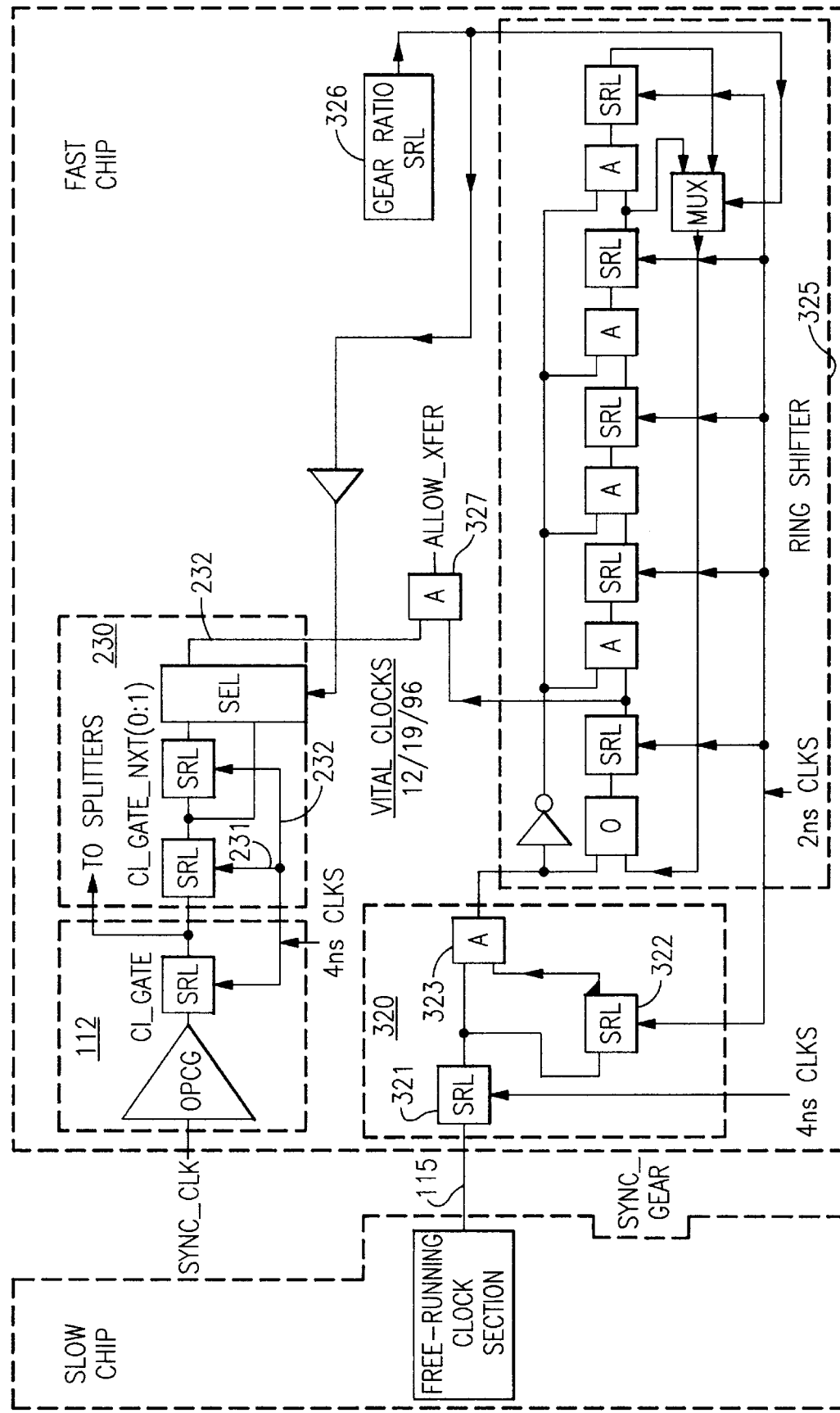
FIG. 3 shows details of the synchronizing mechanism of FIG. 1 for the "fast" chip.

FIG. 3 shows a detailed description of the synchronizing mechanism 12 on the fast chip 11 and the edge detector 320 having and two SRLs 321, 322, and And gate 323. The SYNC_GEAR signal 115 is received, an edge detection with edge detector 320 is performed via the first 2 SRLs, and the result from the And gate 323 is used to start and periodically resynchronize the sync mechanism ring shifter 325 of the fast chip. This sync mechanism ring shifter 325 defines the timing position of the ALLOW_XFER signal 327, which allows the fast chip interface registers in interface 111 to load new values once every slow chip cycle. Further, the clock gate generation is used to create a further delayed gate sequence with delay generator 230 having two SRLs 231 and 232, and with input of the ALLOW_XFER 327, which insures that the fast chip 11 never starts transfers with the slow chip before the slow chip's clocks have started. Just like FIG. 2, the gear ration is selected via an actual scan value at the gear ratio input 326.

A New Implementation.

For a new commercial embodiment of our described preferred embodiment we have been able to use it for a slower chip design provided by the cryptographic design used by IBM in the last generation machine, which we call the ESA/390 G4 machine's CRYPTO chip design, adding our improvements to the design to enable its future use. The improvements which we have made has two major advantages. First, our solution allows the slower chips design made during the development of older technology to be used in a next generation systems with chips that will be running at a much faster frequency. For our current work relating to use of a new generation of CP processor chips, this has resulted in significant savings in the development and manufacturing costs by using the same CRYPTO design (with slight modifications) and manufacturing it in an older technology. The CRYPTO chips' cycle time is 4 times slower than the CP chips' cycle time, but our design allows these two chips to communicate with each other properly. In fact we extended our design to allow for the possibility that the CP chip becomes even faster, say for example 5 times faster than the CRYPTO chip as illustrated by FIG. 4. Our design will still ensure that the two chips communicate with each other properly at the 5:1 cycle time ratio.

The second advantage of our design is that it allows the clock chip to be designed independent of the frequency of the CRYPTO chip. This allows the clock chip to be designed before the other chips and give complete freedom to the CRYPTO design (different and older technology than the target machine design) to work any multiple frequency.

In addition, this independency of design allows the same clock chip part number to be used from one machine generation to the next, with out having to design for what frequency the CRYPTO chip (different design level) will eventually be working at.

Our process is summarized in FIG. 4. There we show a timing diagram that illustrates one example (gear ratio 5) of our method of insuring synchronous data transfers while maintaining data integrity during clock starting and stopping. As will be shown there is a defined timing point for possible alignments of the nest and slow clock, called "SYNC_CA", "SYNC_CB", . . . These are generated and maintained through the sync gen logic detailed in FIG. 1, and they are transmitted to the sync mechanism 125 in the fast chip through the SYNC_GEAR 115 signal. The timing diagram further shows a line that is one nest cycle wide is generated (lines 1, 2, 3, 4, 5 in the example of FIG. 3) for every possible clock-on cycle(1, 2, 3, 4, 5) generated in a nest-speed chip from the SYNC_CLK signal 110. It then shows a corresponding line which is one slow cycle wide which shows where the same SYNC_CLK signal would produce a slow clock-on cycle. The diagram clarifies the solutions for the two data integrity exposures: clock starting and clock stopping. In the clock starting case we see that in most alignments the fast chip starts before the slow chip, and in the case of a first nest cycle in SYNC_CC, for instance, we can see a transfer cycle (xfer) before the slow chip has even started up which occurs in the middle of SYNC_CC. The solution is to block the transfer (xfer) for a number of cycles after the fast chip starts, to insure that the slow chip has started. The timing diagram also illustrates the stopping data integrity exposure and its solution. When SYNC_CD, for example, is the last nest cycle (corresponding to line 2), we can see the slow cycle extends for three more nest cycles beyond and there is a transfer after the line 2 has stopped. The solution is to preemptively block the last two slow cycles (1', 2') when the dropping edge of SYNC_CLK 110 is detected. This insures that the last slow cycle (line 5' of a period just before that illustrated) is active during the last fast cycle that actually allows an xfer, which was during the previous SYNC_CA.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A system for enabling chips having different clock frequencies to communicate, comprising:
    a computer system having an interconnected number of chips having at least two chips with different internal design clock frequencies, including slow chip and fast chips,
    a master clock source for at least those chips which have different internal design clock frequencies to provide a master clock reference signal which controls whether the chip internal clocks are on,
    each of said slow chips and said fast chips having said different internal design clock frequencies having chip intrepretation logic for intrepreting said reference signal as it pertains to the chip's internal clock frequency, a fast chip intrepretation logic intrepreting said reference signal such that a fast chip's internal clock always rises with a rising reference signal, and said slow chip intrepretation logic intrepreting said reference signal such that a slow chip's internal clock only rises periodically with said reference signal.

2. A system according to claim 1 wherein said master clock reference signal is clocked out by latches timed in accordance with a system reference clock.

3. A system according to claim 1 wherein said slow chip interpretation logic includes synchronization pulse generator logic for generating a signal that is sent to the fast chip so that the fast chip predicts ahead of time when the fast clock will rise in the same period with the slow clock.

4. A system according to claim 3 wherein said synchronization pulse generator signal is generated from a series of SRLs (Shift Register Latches) some of which are clocked by the slow chip's internal clock and some of which are clocked by the system clock and during synchronization said synchronization pulse generator logic utilizes the reference signal and makes use of fixed edge timing relationships to determine alignment which is encoded in said series of SRLs representing a relative alignment state of said fast clock and slow clock.

5. A system according to claim 4 wherein in said series of SRLs representing a relative alignment state of said fast clock and slow clock one bit is turned on by the output of said slow chip interpretation logic and wherein synchronization pulse generator logic generates a signal that is sent to the fast chip periodically so as to maintain in the series of SRLs a state that during all cycles represents relative alignments, with one specific bit of the series of SRLs being active every time the fast and the slow chip clocks exactly line up to allow a transfer signal to occur.

6. A system according to claim 5 wherein said transfer signal enables latches for the interface between said fast chip and slow chip to consider a transfer signal cycle complete.

7. A system according to claim 6 wherein said transfer signal enables latches for the interface between said fast chip and slow chip to consider a transfer signal cycle complete so that incoming data is gated in and outgoing data is switched for the next transfer based on the one specific bit of the series of SRLs which is active every time the fast and the slow chip clocks exactly line up to allow a transfer signal to occur.

8. A system according to claim 6 wherein allowance of a transfer signal to occur is blocked for a specific number of cycles after a reference clock signal has occurred to guarantee that the slow clock has started and will be ready for the first transfer cycle in time for the transfer.

9. A system according to claim 8 wherein a slow clock cycle is preemptively canceled based upon the alignment of the slow and fast clocks at the moment that a reference signal first drops, as determined by the setting of said series of SRLs.

10. A system according to claim 8 wherein the system enables synchronous data transfers while maintaining data integrity during clock starting and stopping for multiple chip intercommunication so as to enable said first and second chips to be of different technologies even though they are to be used in the same system and yet enable the transfer of date between them to maintain synchronous communication between said first and second chips even though they are operating at the different frequencies.

11. A system according to claim 1 wherein a signal is issued to all the chips in the system to start their clocks and begin processing data between chips including those that run at different frequency multiples with a fast chip communicating to a chip that is a gear ratio of ×times as slow and signaling when to send and receive data at the slow chips rate in order to guarantee that all transfers complete successfully, and wherein said slow chip initiates a launch to the fast chip after the fast chip has had its clocks running long enough to receive that data from said slow chip.

12. A system according to claim 11 wherein the system logic mechanism is provided to use the relative alignment of said fast and slow chip clocks to create a signal that will stop all the clocks to all the chips in the system.

* * * * *